ABSTRACT# United States Patent [19]

Roger

[11] 4,355,534
[45] Oct. 26, 1982

[54] DEVICE FOR DETECTING DEFECTIVE COMBUSTION IN AN INTERNAL COMBUSTION ENGINE

[75] Inventor: Raymond Roger, Versailles, France

[73] Assignees: Automobiles Peugeot; Automobiles Citroen, both of Paris, France

[21] Appl. No.: 221,570

[22] Filed: Dec. 31, 1980

[30] Foreign Application Priority Data

Jan. 7, 1980 [FR] France ............................... 80 00191

[51] Int. Cl.³ ............................................ G01L 23/22
[52] U.S. Cl. ....................................................... 73/35
[58] Field of Search ............................ 73/35; 123/425

[56] References Cited

U.S. PATENT DOCUMENTS 4,002,155 1/1977 Harned et al. ........................... 73/35
4,282,841 8/1981 Takagi ................................. 123/425

FOREIGN PATENT DOCUMENTS 2925770 1/1980 Fed. Rep. of Germany ...... 123/425

Primary Examiner—James J. Gill
Attorney, Agent, or Firm—Burns, Doane, Swecker & Mathis

[57] ABSTRACT

The invention relates to a device for detecting combustion defects in an internal combustion engine which are in the form of pinking. The device comprises a detector placed on the cylinder head of the engine and a system for utilizing the signals of the detector. The system comprises means for converting the analog data delivered by the detector into digital data, means for temporarily storing, in the course of each cycle, the digital data relating to each cylinder of the engine, and means for comparing the data relating to each cylinder, stored in succession in the course of a cycle, with corresponding data obtained in the course of the following cycle.

The device is applicable in particular in devices for initiating the ignition of an engine.

4 Claims, 2 Drawing Figures

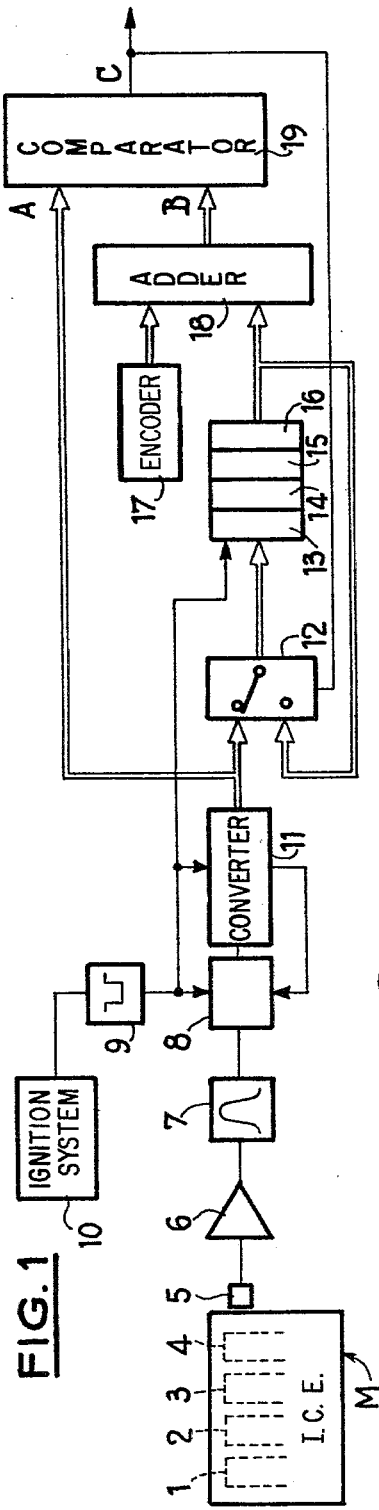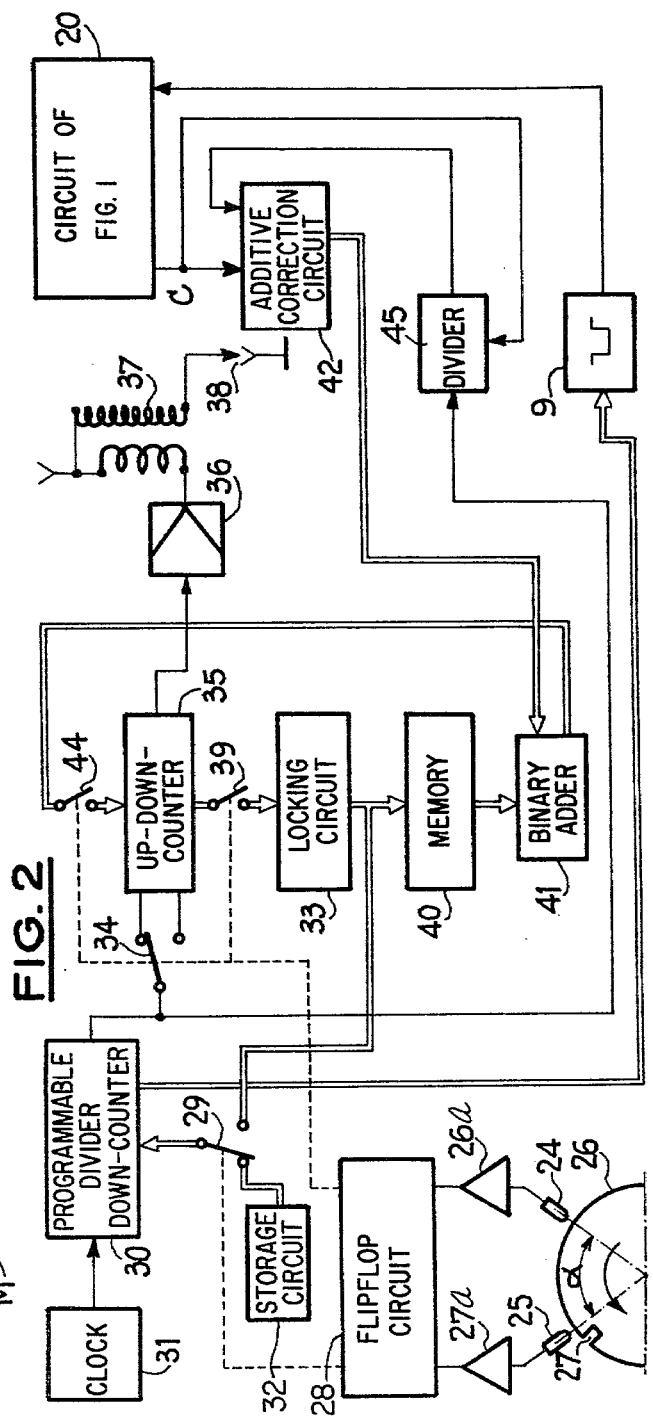

DEVICE FOR DETECTING DEFECTIVE COMBUSTION IN AN INTERNAL COMBUSTION ENGINE

DESCRIPTION

The present invention relates to the detection of defective combustion in an internal combustion engine and more particularly concerns the defect known as "pinking".

The detection of pinking in an engine having one or more cylinders is usually achieved by means of a detector of the accelerometer type or a pressure detector placed in a suitable manner on the cylinder head of the engine. The detector transmits a number of data to a system adapted to utilise the signal. This data represents mainly the "noise" due to the operation of the engine from which noise the possible information of the existence of pinking must be extracted.

The problem is complex since the level of the "noise" varies from one engine to another, from one cylinder to another in the same engine, and as a function of the load and of the running speed for the same cylinder. The comparison of the signal delivered by the detector with a fixed threshold consequently does not permit detecting in a sure manner the appearance of the pinking.

There is also known an entirely analog detecting device comprising a detector placed on the cylinder head of the engine and a system for utilising the signals delivered by this detector and comprising means for temporarily storing in the course of each cycle the data received relating to each cylinder, and means for comparing these data with those which are received in the course of the following cycle. However, as this system is a fully analog system, it is little reliable and does not lend itself well to an application in the field of the automobile in which such devices must operate in a relatively difficult environment.

The invention consequently has for object to provide a simple and reliable device which is capable of delivering precise and reliable information as soon as pinking occurs.

According to the invention there is provided a device for detecting combustion defects in an internal combustion engine, comprising a detector placed on the cylinder head of the engine and a system for utilising the signals of said detector and comprising means for temporarily storing in the course of each cycle the data relating to each cylinder of the engine, and means for comparing the data relating to each cylinder stored in succession in the course of the cycle with corresponding data obtained in the course of the following cycle, wherein the utilisation system comprises means for converting analog data delivered by the detector into digital data and said temporary storing means comprise as many shifting registers connected in series as the engine has cylinders, said registers being connected to a switching circuit controlled by the output signal of said comparing means and adapted to connect the first shifting register with the output of the converting means or with the output of the last shifting register, the last-mentioned output being furthermore connected to means for adding a threshold value ($\Delta$), and connected to said comparing means.

According to other features of the invention:
said analog-to-digital converting means and said temporary storing means are controlled by a decoder which delivers a rectangular signal whose duration corresponds, in the known manner, to an angular interval of rotation of the flywheel of the engine in the course of which the defect is liable to occur;
an encoder producing said threshold value ($\Delta$) is connected to said adding means.

An embodiment of the invention will be described in the ensuing description with reference to the accompanying drawings in which:

FIG. 1 is a diagram of the device according to the invention;

FIG. 2 is a diagram of the device associated with a device for initiating the ignition according to the U.S. Pat. No. 4,296,471 issued Oct. 20, 1981 to Goux.

The described device is assumed to be employed for the detection of pinking in an internal combustion engine M having four cylinders 1, 2, 3, 4. This device comprises an analog part and a digital part.

The analog part comprises a pinking detector 5, for example an accelerometer, fixed to the engine M, a load amplifier 6, a bandpass filter 7 adapted to eliminate undesirable frequencies, and a circuit 8 which produces a maximum peak voltage in the course of each period of measurement corresponding to a rectangular pulse produced by a decoder 9. This decoder may be triggered for example by means of an electronic ignition system 10. The pulse permits carrying out the measurement, for each cylinder, in an angular interval in the course of which the pinking is liable to occur.

The digital part comprises an analog-to-digital converter 11, a switching circuit 12, a group of four shifting registers 13, 14, 15, 16, connected in series, an encoder 17, an adder 18 and a comparator 19 having two inputs A, B and an output C.

The device just described operates in the following manner. The analog part of the circuit produces a voltage wich is a function of the maximum peak value given by the pinking detector 5 during the duration of the pulse.

The analog-to-digital converter converts this voltage into a digital value which is sent to the switching means 12 and to the input A of the comparator 19.

In the illustrated case of an engine having four cylinders, when the detector 5 receives the information relating to the cylinder 1, the shifting register 13, 14, 15, 16 contain the maximum peak values corresponding to the cylinders 2, 4, 3, 1 respectively. These values are those which have been measured, for each cylinder, in the preceding cycle.

At the output of the register 16, there is obtained the preceding maximum peak value of the cylinder 1. There is added in the adder 18 to this value a threshold value $\Delta$ delivered by the encoder 17 and which, when it is reached, indicates the presence of pinking. This sum is sent to the input B of the comparator 19 and is compared with the value which issues directly from the converter 11 and is introduced through the input A.

If A > B, there is pinking. The output C of the comparator is at "1" level and it is employed for reducing the advance of the ignition so as to eliminate the pinking. In this case, the output of the register 16 is recoupled to the register 13 by the switching means 12 before effecting the shift.

If A < B, there is no pinking. The output C of the comparator is at "0" level. The output of the converter 11 is applied to the input of the register 13 by the switching means 12 before effecting the shift.

The shifting of the registers 13, 14, 15, 16 is triggered by the end of the pulse produced by the decoder 9.

The described device, which is of great simplicity, has the following advantages:

A variable comparison threshold is employed for extracting the "presence of pinking" information from the noise signal.

This threshold is obtained by measuring, for each cycle of the engine, the level of the noise during an angular travel of observation of the phenomenon, this noise level being stored for the purpose of a comparison thereof with that of the following cycle. This renders the system independent of the dispersions of the noise level from one engine to the other and the variation thereof as a function of the load, the engine running speed and the evolution of the engine during its life.

The comparison is effected, for each cylinder, with the preceding values obtained from the same cylinder. In this way, the effect of differences between the cylinders of a given engine is avoided.

In the case of detection of pinking, the noise level previously stored is kept as a reference until the disappearance of the anomaly.

With reference to FIG. 2, the foregoing circuit having the general reference numeral 20, is associated with the device initiating the ignition shown in FIG. 2 of the aforementioned U.S. patent application Ser. No. 45 770.

This device comprises two detectors 24 and 25, placed in the vicinity of a disc 26 provided with a notch 27. The detector 25 and the reference 27 are positioned in such manner that the passage of the reference in front of the detector occurs for an angular position of the crankshaft corresponding to a minimum ignition advance. The detector 24 is positioned in angular advances of $\alpha$ degrees relative to the detector 25, the value of the angle $\alpha$ being such that $\alpha$ exceeds the maximum desired angle of advance relative to the initial advance. The outputs of the detectors 24 and 25 are connected through shaping circuits 26a and 27a to the inputs of a flipflop circuit 28 a first output of which controls a switch 29. The latter is adapted to connect a programmable divider down-counter 30, which receives pulses from a clock 31, either to a circuit 32 for storing the angle $\beta$ equal to the difference between 360° and the angle $\alpha$ between the two detectors 24 and 25, or to a locking circuit 33. The other output of the flipflop circuit 28 controls a second switch 34 adapted to connect the programmable divider down-counter 30 to a first or a second input of a prepositionable up-down-counter 35 whose output is connected to a power stage 36 supplying the ignition coil 37 of the spark-plugs, such as 38, of the engine M of FIG. 1.

The up-down-counter 35 comprises an output connected to the locking circuit 33 through a contact 39 which is coupled to the switch 34. The output of the locking circuit 33 is connected to a memory 40 and to the programmable divider down-counter 30 through the switch 29. The output of the memory 40 is itself connected to a binary adder 41 another input of which is connected to the circuit 20 through an additive correction circuit 42. The output of the binary adder 41 is connected to a pre-positioning input of the up-down-counter 35 through another contact 44 coupled to the switch 35.

The switches 29, 34 and the contacts 39, 44 may be controlled indifferently by either of the outputs of the flipflop circuit 28.

In the unit just described, the decoder 9 (FIG. 1) producing the pulse in the course of which the measurement is carried out, receives an information representing the state of the programmable divider down-counter 30.

The output of the circuit 20, which is the output C of the comparator 19, is connected to the additive correction circuit 42 formed by an up-down-counter. The latter is also connected to the output of the programmable divider down-counter 30 through a divider 45 whose input is connected to the output C of the comparator 19.

When the output C is at "1" level, which indicates the presence of pinking, the up-down-counter 42 acts in the up-counting mode which reduces the ignition advance. This reduction is increased for each cycle so long as the pinking remains until a predetermined maximum is reached.

When the output C returns to "0" level, which indicates the disappearance of the pinking, the up-down-counter 42 acts in the down-counting mode and this results in a progressive return to the initial ignition advance. This return to the initial ignition advance occurs more slowly than the reduction in the ignition advance under the effect of the pinking by action on the divider 45 by the output C of the comparator 19.

Having now described my invention what I claim as new and desire to secure by Letters Patent is:

1. In a device for detecting combustion defects in an internal combustion engine comprising a detector for placing on the cylinder head of the engine and a system for utilising signals delivered by said detector and comprising means for temporarily storing in the course of each cycle data relating to each cylinder of the engine, and means for comparing the data relating to each cylinder, stored in succession in the course of a cycle, with corresponding data obtained in the course of the following cycle; the improvement wherein the utilisation system comprises means connected to the detector for converting analog data delivered by the detector into digital data and said temporary storing means comprise as many shifting registers connected in series as the engine has cylinders, said registers being connected to a switching circuit which is connected to an output of said comparing means so as to be controlled by the output signal of said comparing means, said switching means being capable of selectively connecting a first shifting register with an output of the converting means and with an output of a last shifting register, the last-mentioned output being furthermore connected to means for adding a threshold value and connected to said comparing means.

2. A device according to claim 1, comprising a decoder which is connected to control said analog-to-digital converting means and said temporary storing means and delivers a rectangular signal whose duration corresponds to an angular interval of rotation of the flywheel of the engine in the course of which rotation the defect is liable to occur.

3. A device according to claim 1, wherein an encoder for producing said threshold value is connected to said adding means.

4. The combination of a device for initiating the ignition of an internal combustion engine and a device for detecting combustion defects and modifying the ignition advance of the engine if said defects are detected, said combustion defect detecting device comprising a detector for placing on the cylinder head of the engine and a system for utilising signals delivered by said detector and comprising means for temporarily storing in the course of each cycle data relating to each cylinder of the engine, and means for comparing the data relating to each cylinder, stored in succession in the course of a cycle, with corresponding data obtained in the course of the following cycle, the utilization system comprising means connected to the detector for converting analog data delivered by the detector into digital data and said temporary storing means comprising as many shifting registers connected in series as the engine has cylinders, said registers being connected to a switching circuit which is connected to an output of said comparing means so as to be controlled by the output signal of said comparing means, said switching means being capable of selectively connecting a first shifting register with an output of the converting means and with an output of a last shifting register, the last-mentioned output being furthermore connected to means for adding a threshold value and connected to said comparing means.

* * * * *